US008792698B2

(12) United States Patent
Goto et al.

(10) Patent No.: US 8,792,698 B2
(45) Date of Patent: Jul. 29, 2014

(54) MEDICAL IMAGING PROCESSING DEVICE, MEDICAL IMAGE PROCESSING METHOD, AND PROGRAM

(75) Inventors: Yoshihiro Goto, Tokyo (JP); Tetsuo Nakazawa, Tokyo (JP); Kuniyoshi Nakashima, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 997 days.

(21) Appl. No.: 12/919,129

(22) PCT Filed: Feb. 16, 2009

(86) PCT No.: PCT/JP2009/052518
§ 371 (c)(1),
(2), (4) Date: Aug. 24, 2010

(87) PCT Pub. No.: WO2009/107500
PCT Pub. Date: Sep. 3, 2009

(65) Prior Publication Data
US 2011/0002522 A1 Jan. 6, 2011

(30) Foreign Application Priority Data

Feb. 25, 2008 (JP) .................................. 2008-042934

(51) Int. Cl.
G06T 7/00 (2006.01)
G09G 5/377 (2006.01)
(52) U.S. Cl.
USPC .......................................... 382/131; 345/634
(58) Field of Classification Search
None
See application file for complete search history.

(56) References Cited

U.S. PATENT DOCUMENTS

| 7,677,540 | B1* | 3/2010 | Duval ............................ 267/179 |
| 2003/0216665 | A1 | 11/2003 | Masuo et al. |
| 2004/0215071 | A1* | 10/2004 | Frank et al. .................... 600/407 |
| 2006/0204063 | A1* | 9/2006 | Nakashima et al. ........... 382/128 |
| 2007/0053485 | A1 | 3/2007 | Kobayashi |

FOREIGN PATENT DOCUMENTS

| JP | 2003-299629 | 10/2003 |
| JP | 2004-57275 | 2/2004 |
| JP | 2006-61687 | 3/2006 |
| JP | 3120546 | 3/2006 |
| JP | 2007-68845 | 3/2007 |
| JP | 2007-135858 | 6/2007 |
| WO | WO2004/089219 | 10/2004 |

OTHER PUBLICATIONS

Sirakov N., A New Active Convex Hull Model for Image Regions, J Math Imaging Vis 26, pp. 309-325, Aug. 14, 2006.*

* cited by examiner

*Primary Examiner* — Elaine Gort
*Assistant Examiner* — Gregory Lultschik
(74) *Attorney, Agent, or Firm* — Cooper & Dunham LLP

(57) ABSTRACT

Provided is a medical image processing device including: medical image information acquisition unit which acquires medical image information indicating a tomographic image of an object to be examined; evaluation region extraction unit which extracts an evaluation region for each of the tissues contained in the acquired medical image information according to a pixel value, a concentration value, or a luminance value for each of the tissues; and evaluation region display unit which displays the evaluation region on a display device.

6 Claims, 22 Drawing Sheets

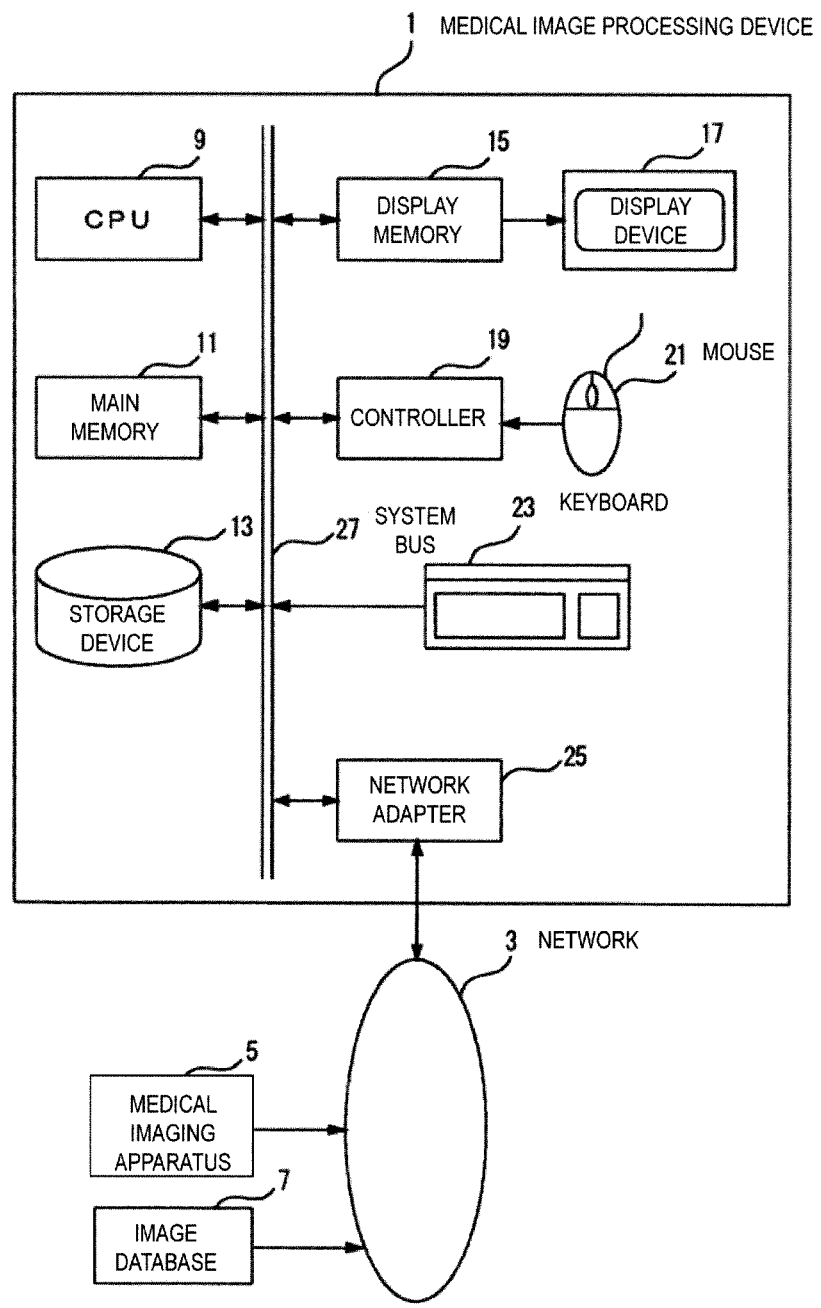

F I G . 5
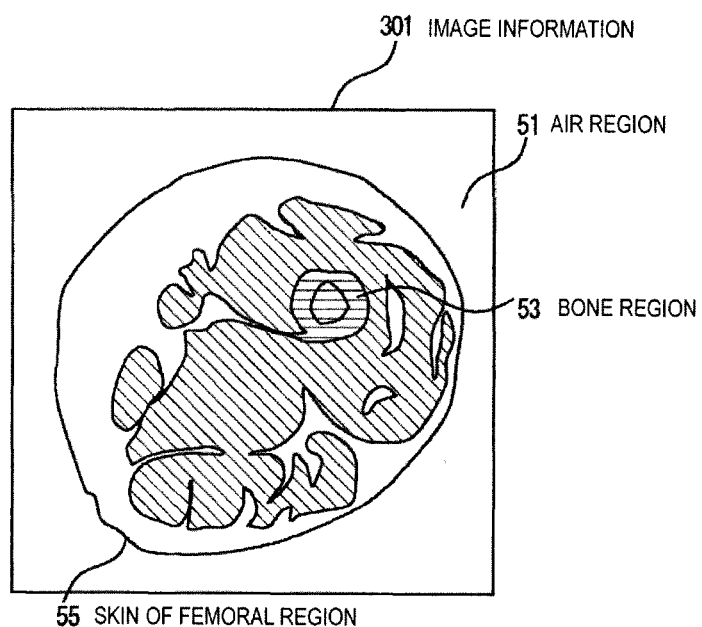

F I G . 1 0
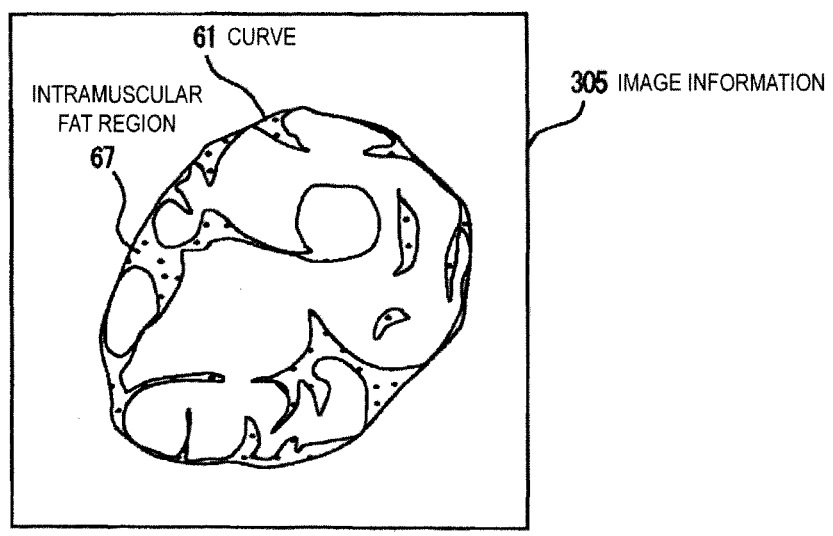

F I G . 1 6
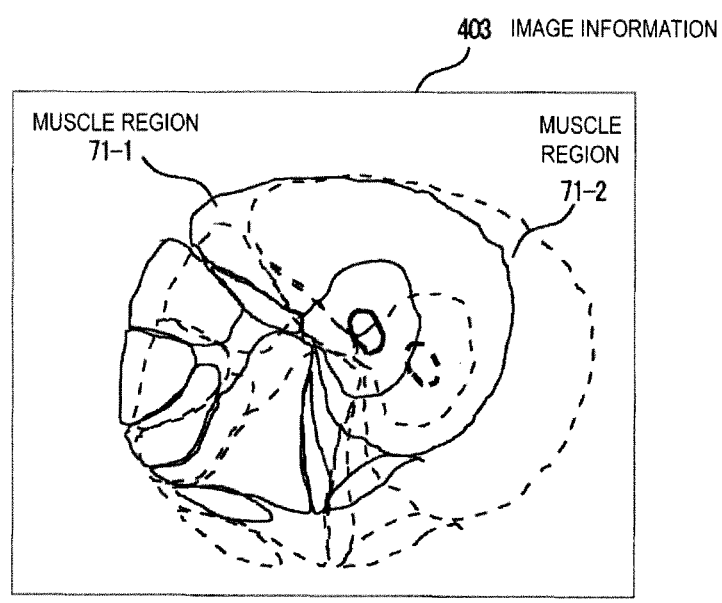

F I G . 1 8
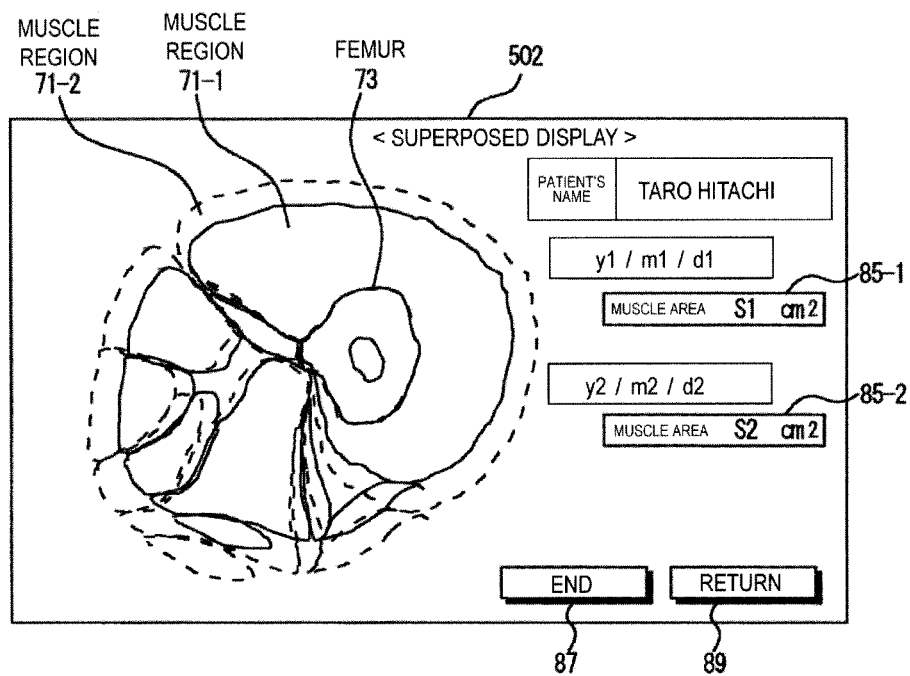

F I G . 2 1
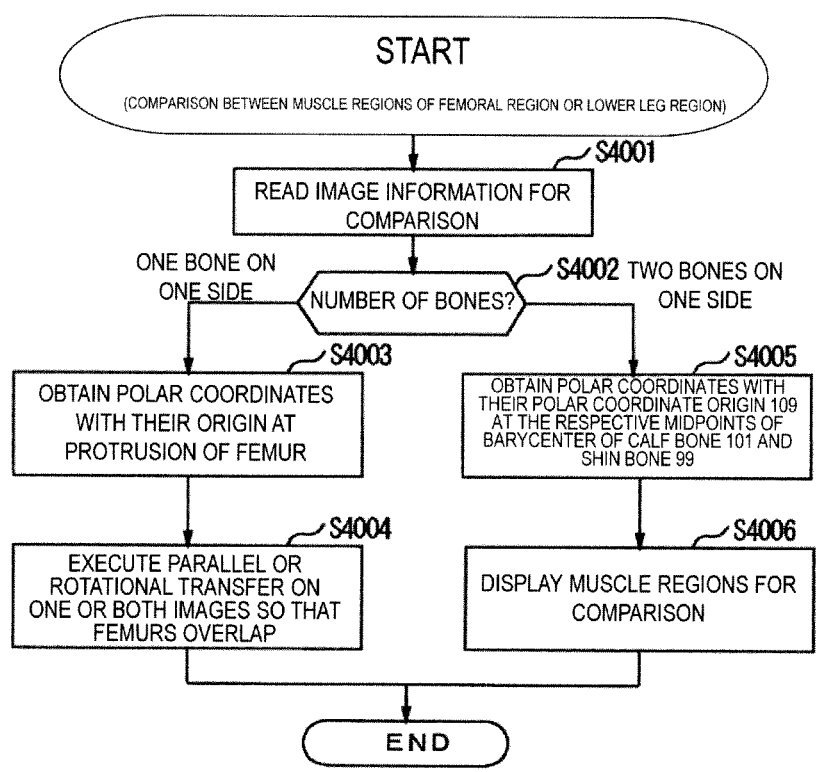

F I G . 2 2
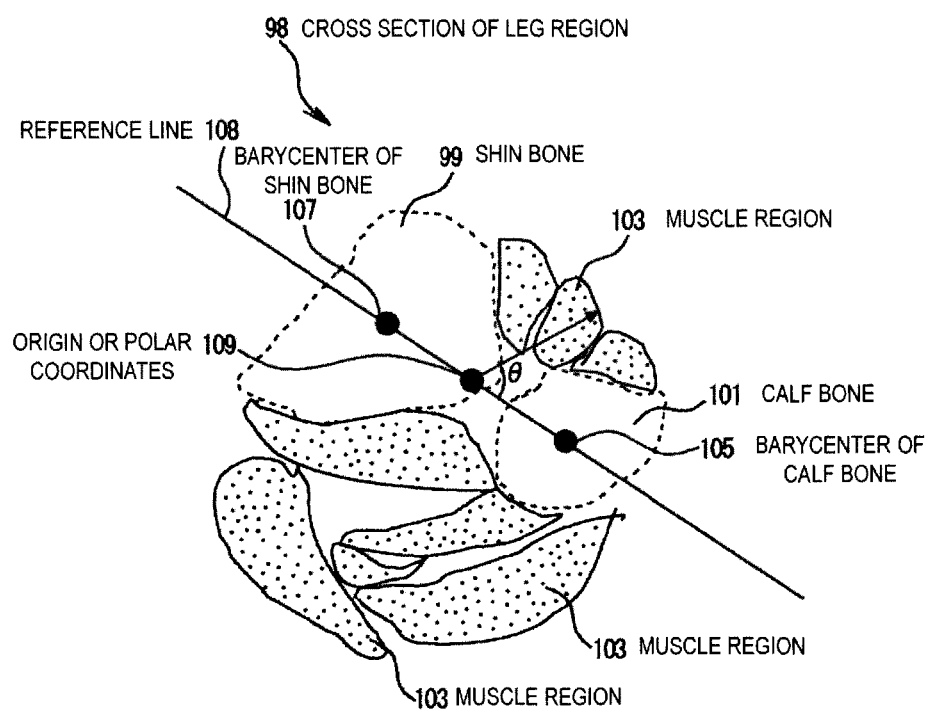

MEDICAL IMAGING PROCESSING DEVICE, MEDICAL IMAGE PROCESSING METHOD, AND PROGRAM

FIELD OF THE INVENTION

The present invention related to a medical image processing device for processing and displaying medical image information acquired by a medical imaging apparatus such as an X-ray CT apparatus, MRI apparatus and ultrasonic diagnostic apparatus. In particular, it is related to a medical image processing device that generates images for making diagnosis of effect in training or treatment based on the medical image information.

DESCRIPTION OF RELATED ART

In recent years, awareness of the need for muscle training by elderly people has been increased in an effort to reduce medical expense in aging society. Athletes or patients who are in rehabilitation from injuries, etc. are also in need of muscle training.

For example, muscle of a femoral region (a thigh muscle) is related to motion to support a body, run, jump, extend a knee, and so on. The muscle in the front side of a femoral region serves a role to extend the leg, and the muscle on the back side serves a role to bend the leg. The thigh muscle having such significant role needs training in both the front and the back portions to be strengthened.

Muscles of athletes or patients are increased in their thickness when they develop their muscles by training. One of the indicators to find out the level of training effect is the method to measure the area of muscle sections and compare them over time. For example, there is a method that the medical information of an object acquired using a medical imaging apparatus is displayed on a display device and an operator measures the area of a muscle section in the cross-sectional image of a femoral region by operating a device such as a mouse.

Another method quantitatively measures the amount of intramuscular fat and sets the amount as the index to measure and diagnose the level of training effect.

As the index for amount of intramuscular fat, there is a method to use the measure of dispersion calculated from a difference image of the smoothed image and sharpened image of a muscle tissue image without depending on the CT value of muscle tissue or a piece of fat in a muscle which varies among different individuals (for example, refer to [Patent Document 1]).
Patent Document 1: JP2004-A-81394

However, the technique disclosed in [Patent Document 1] is not capable of extracting a fascia that encloses a muscle region. Since the fascia cannot be made to appear clearly in medical images, it is difficult to discriminate it visually or to perform automatic recognition of the fascia by a computer. Therefore, the difficulty in obtaining the amount of intramuscular fat with high accuracy by dividing the fat region into the intramuscular fat and subcutaneous fat by a fascia still remains as a problem in the technique disclosed in [Patent Document 1].

In the past, operators have been evaluating effect of muscle training by measuring variation in an area of the muscle region in a cross-sectional image, but the problem still remains that the method that measures the area of a muscle by kind and compares it over time, is time consuming which hinders from making an effective diagnosis. There has been also a problem that variation of a cross-sectional area of a muscle with time could not be displayed effectively, which also made it difficult for operators to make speedy and accurate diagnosis.

The objective of the present invention is to provide a medical image processing device which makes it possible to make speedy and accurate diagnosis of a region for evaluation by effectively extracting the evaluation region of the medical image information, considering the above-described problems.

BRIEF SUMMARY OF THE INVENTION

The first invention for achieving the previously mentioned objective is characterized in comprising:
medical image information acquisition means configured to acquire medical image information that indicates a tomographic image of an object to be examined;
evaluation region extraction means configured to extract the evaluation region with respect to the respective tissues included in the acquired medical image information, based on at least one of the pixel value, density value and luminance value; and
evaluation region display means configured to display the evaluation region on a display device.

The medical image processing device of the first invention acquires medical image information indicating a tomographic image of an object, extracts the evaluation region with respect to the respective tissues included in the acquired medical image information based on at least one of the pixel value, density value and luminance value, and displays the extracted evaluation region on a display device.

Medical image information is the image information indicating a tomographic image of an object imaged by a medical imaging apparatus such as an X-ray CT apparatus, MRI apparatus or ultrasonic imaging apparatus.

An evaluation region is a tissue region of at least one of the tissues such as a muscle region, bone region and fat region in the tomogrpahic image of the object.

Also, the evaluation region is the region to be extracted based on the values such as pixel value, density value and luminance value of the tissue for evaluating the effect of the muscle training. The evaluation region may be the extracted specific tissue region (for example, a muscle region), or may be a curve which is circumscribed to the tissue region (for example, a fascia which is circumscribed to a muscle region), etc.

In accordance with the first invention, since the evaluation region which is useful for diagnosis is effectively extracted and displayed for each tissue included in the medical image information that indicates a tomographic image of the object, it is possible to perform accurate and speedy diagnosis.

Also, the medical image processing device may extract a muscle region or fat region based on the acquired medical image information, calculate a contour curve indicating the contour of the muscle region, divide the fat region by inner and outer sides of the contour curve, and display the region of the inner and outer sides of the contour curve by distinguishing them.

By doing so, the contour curve indicating the muscle region can be approximated to the fascia which has been difficult to recognize visually. Also, since amount of fat in the inner and outer sides of the muscle region can be distinguished, it makes it possible to acquire the amount of intramuscular fat with high accuracy.

Also, it may be set to create a straight line group tangent to a muscle region and to obtain the curve inscribed to the closed region formed by the straight line group.

Also, it may be set to acquire a plurality of apical points on the contour of a muscle region, calculate the curve wherein the plurality of apical points are interpolated, and obtain the interpolated curve as the contour curve indicating the contour of the muscle region. The plurality of apical points may be interpolated using the spline interpolation method so as to calculate the curve.

Also, the medical image processing device may extract the respective evaluation regions based on plural sets of medical image information, and comparatively display them on a display device. For example, a predetermined region based on plural sets of medical image information having different imaged times may be comparatively displayed.

Also, the medical image processing device may extract the evaluation region based on the acquired plural sets of medical image information, specify a bone region and a muscle region from the extracted evaluation regions, extract the reference region to be the reference for positioning with respect to each of the specified bone region, and display them by matching the reference regions by performing at least one process from among the parallel shift process, rotational transfer process and scaling process as necessary with respect to the plural sets of medical image information.

The medical image processing device may match the reference regions, and further display the respectively specified muscle regions by overlapping them. In this manner, the areas of the muscle regions of plural sets of medical image information can be speedily compared and evaluated.

Also, the medical image processing device may set a predetermined point included in the extracted reference region as the reference point, set the reference line including the reference point, correspond the distance from the reference point to the contour of the muscle region with the angle formed by the distance thereof and the reference line, and display the corresponded distance and angle. In the case that the reference region is a bone region of a femur, the protrusion of the femur may be set as the reference point. Also, the straight line connecting the reference point and the barycenter of the femur may be set as the reference line.

In this manner, it is possible to approximately diagnose the direction of the increased muscle with respect to the reference point, without individually evaluating the respective muscles which form the muscle region.

Also, the medical image processing device may be set to extract a bone region based on the CT value of the acquired medical image information, and to calculate the reference point, when there are plurality of bone regions, based on a predetermined point acquired for each bone region.

For example, in the case that there are two bone regions in medical image information, the medical image is determined as the image of a lower leg region. In the lower leg region, it may be set to extract a shin bone and a calf bone as bone regions, make the respective barycenters of the shin bone and the calf bone as predetermined points, and set the straight line to connect the respective barycenters of the shin bone and the calf bone as the reference line.

In this manner, since the medical image information of the femoral region and the lower leg region can be automatically distinguished, effectiveness in diagnosis can be improved. Also, the medical image processing device can be applied not only to diagnosis of image information of the lower leg region but also to diagnosis of evaluation regions (fat region, muscle region, etc.) of an abdominal region or chest region.

The second invention is a medical image processing method characterized in including:

a medical image information acquisition step that acquires the medical image information to indicate a tomographic image of an object to be examined;

an evaluation region extraction step that extracts an evaluation region with respect to the respective tissues included in the acquired medical image information based on at least one of the pixel value, density value and luminance value for each tissue; and an evaluation region display step that displays the evaluation region on a display device.

The second invention is related to the medical image processing method in the medical image processing device of the first invention.

The third invention is a program to cause a computer to function as the medical image processing device comprising:

medical image information acquisition means configured to acquire medical image information that indicates a tomographic image of an object to be examined;

evaluation region extraction means configured to extract an evaluation region with respect to the respective tissues included in the acquired medical image information based on at least one of the pixel value, density value and luminance value; and evaluation region display means configured to display the evaluation region on a display device.

The third invention is related to a program to cause a computer to function as the medical image processing device of the first invention.

In accordance with the present invention, it is possible to provide a medical image processing device capable of effectively extracting an evaluation region of medical image information so as to make diagnosis of the evaluation region speedily and accurately.

BRIEF DESCRIPTION OF THE DRAWINGS

FIG. 1 is a hardware block diagram of medical image processing device 1.

FIG. 5 shows image information 301.

FIG. 10 shows image information 305 including intramuscular fat region 67.

FIG. 16 shows image information 404.

FIG. 18 shows screen 502 of the superposed display.

FIG. 21 is a flowchart showing a comparative process of a muscle region in a femur region or a lower leg region.

FIG. 22 shows how to obtain the origin and the reference line in cross-section 98 of a lower leg region.

DESCRIPTION OF THE NUMERAL REFERENCES

Figure 2:
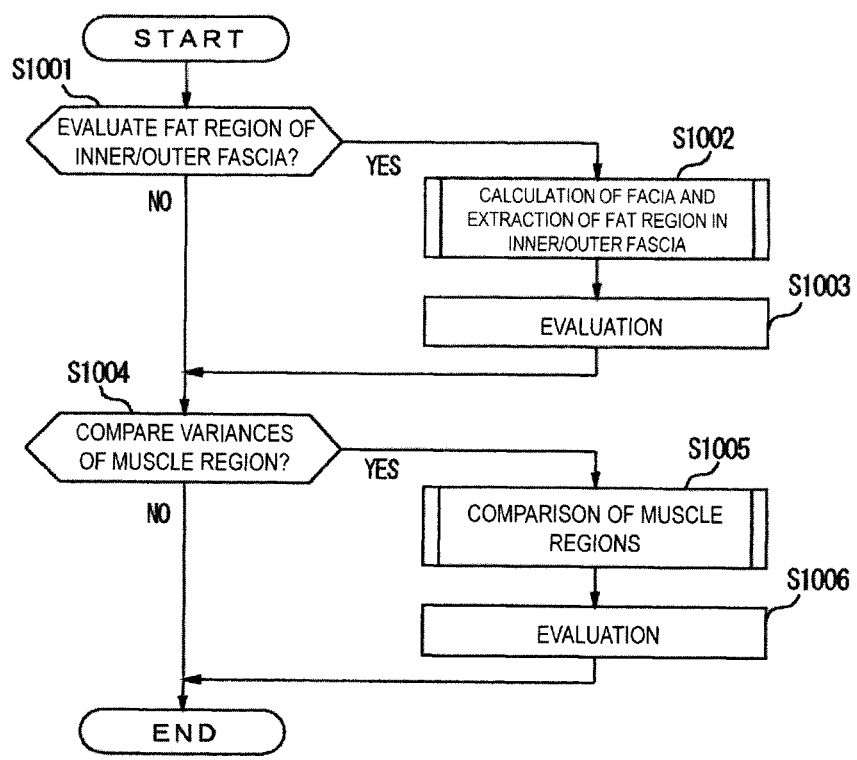
FIG. 2 is a flowchart showing the overall operation of medical image processing device.

1: medical image processing device, 3: network, 5: medical imaging apparatus, 7: image database, 9: CPU, 11: main memory, 13: storage device, 15: display memory, 17: display device, 19: controller, 21: mouse, 23: keyboard, 25: network adapter, 27: system bus, 31: cross-section of a femoral region, 33: femur, 35: lateral vastus muscle, 37: medial vastus muscle, 39: fascia, 41: gracilis, 43: satorius, 45: skin of a femoral region, 47: subcutaneous fat, 51: air region, 53: bone region, 55: skin of a femoral region, 57: muscle region, 59: tangent line, 61: curve, 64: outer region, 65: inner region, 67: intramuscular fat region, 69: subcutaneous fat region, 71-1, 71-2 and 103: muscle region, 73, 73-1 and 73-2: femur, 75: patient's name, 77: imaging region, 79: imaging date, 81: "superposed display" button, 83: "radial display" button, 85-1 and 85-2: muscle area display, 87: "end" button, 89: "return" button, 91: protrusion of a femur, 93: barycenter of a femur, 94 and 108: reference line, 95: angle, 97: distance, 98: cross-section of a lower leg region, 99: shin bone, 101: calf bone, 105: barycenter of a calf bone, 107: barycenter of a shin bone, 109: origin of polar coordinates, 301~306 and 401~404: image information, 501~503: screen

DESCRIPTION OF RELATED ART

A preferable embodiment of the present invention will be described in detail referring to the attached diagrams. In the following description, the same function parts are represented by the same reference numerals, and the duplicative description thereof is omitted. Also, the following embodiments will be described exemplifying the case that image processing is executed on an X-ray CT image of a femoral region of an object.

(1. Configuration of Medical Image Processing Device 1)

First, configuration of medical image processing device 1 will be described referring to FIG. 1.

FIG. 1 is a hardware block diagram of medical image processing device 1.

Medical image processing device 1 is configured by CPU 9, main memory 11, storage device 13, display memory 15, display device 17, mouse 21 or keyboard 23 which is connected to controller 19 and network adapter 25 are all connected via system bus 27. Medical image processing device 1 is connected to medical imaging apparatus 5 or image database 7 via network 3.

CPU 9 is a device that controls operation of the respective components. CPU 9 loads and executes the program to be stored in storage device 13 or data necessary for executing the program in main memory 11. Storage device 13 is a device to acquire and store the medical image information obtained by medical imaging apparatus 5 via network 3 such as LAN (local area network). Also, storage device 13 is for storing the program to be executed by CPU 9 or data necessary for executing the program. Main memory 11 stores intermediate processing of the program or calculation to be executed by CPU 9.

Mouse 21 and keyboard 23 are operation devices for an operator to input operation commands to medical image processing device. Display memory 15 stores display data to be displayed on display device 17 such as liquid crystal display or CRT. Controller 19 detects the condition of mouse 21 and the position of the mouse pointer on display device 17, and outputs the detected signal to CPU 9. Network adapter 25 connects medical image processing device 1 to network 3 such as a LAN, telephone circuit or the internet.

Medical imaging apparatus 5 is for imaging medical image information such as a tomographic image of the object. It is, for example, an X-ray CT apparatus, MRI apparatus or ultrasonic diagnostic apparatus. Image database 7 is a database system that stores the medical image information imaged by medical imaging apparatus 5. Image database 7 may be for accumulating the medical image information imaged by a plurality of other medical imaging apparatuses to be connected to network 3.

<Outline for Evaluation of Medical Image Information>

(2. Operation of Medical Image Processing Device 1)

Next, the outline for creation of an evaluation image in cross-section information of a femoral region by medical image processing device 1 will be described referring to FIG. 1 and FIG. 2.

FIG. 2 is a flowchart showing overall operation of medical image processing device 1.

Figure 3:
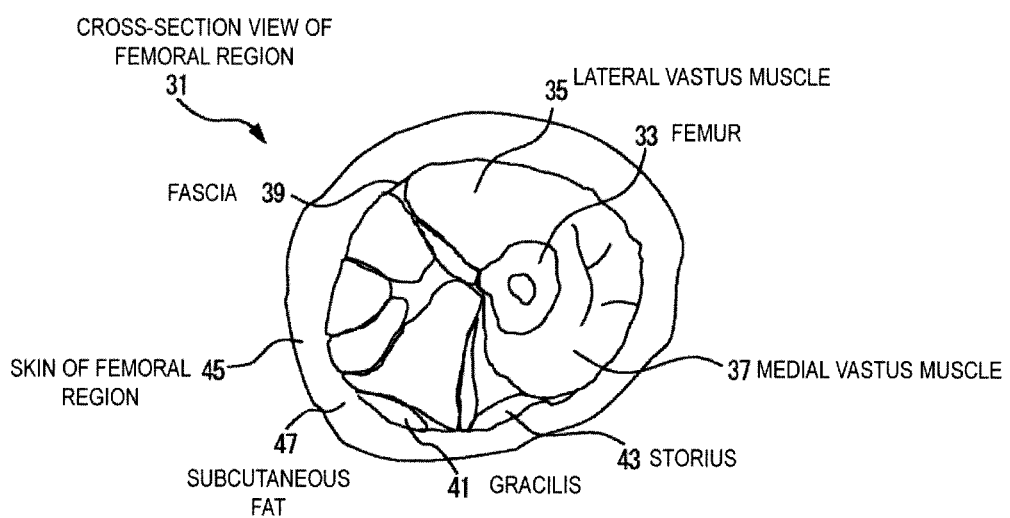
FIG. 3 shows cross-sectional image 31 of a femoral region.

FIG. 3 shows cross-section 31 of a femoral region.

As shown in cross-section 31 of the femoral region (FIG. 3), the muscle region of the femoral region encompasses femur 33, and the muscle region is enveloped by fascia 39. The operator occasionally performs evaluation by distinguishing subcutaneous fat 47 which is in the outer side of fascia 39 and an intramuscular fat which is in the inner side of fascia 39 that are in the same fat region.

In the case of evaluating the fat region of inner and outer fascia (YES in step 1001), medical image processing device 1 executes "calculation of the fascia and extraction of the fat region in the inner and outer fascia" (step 1002). "Calculation of the fascia and extraction of the fat region in the inner and outer fascia" is the process to extract a fascia from the acquired medical image information and to divide the fat region setting the fascia as a border, which will be described later in detail.

On the basis of the result displayed by distinguishing subcutaneous fat region 47 and intramuscular fat, the operator evaluates effect of training or treatment by executing area measurement, etc. of the fat region (step 1003). Since it is desirable that the amount of fat decreases in the muscle, the operator can determine the effect of training with high accuracy by, for example, measuring the amount of intramuscular fat over time.

In the case of not evaluating the fat region in the inner and outer sides of the fascia (NO in step 1001) or when the evaluation of the fat region in the inner and outer sides of the fascia is completed, step 1004 is to be carried out. In the case of comparing the variation of muscle regions (YES in step 1004), medical image processing device 1 executes "comparative process of the muscle region" (step 1005). The "comparative process of the muscle region" is, for example, a process that variation of the muscle region over time is to be compared with respect to plural sets of medical image information having different imaged times. In this manner, the operator can determine the effect of training or treatment by measuring the increase and decrease of the muscle region. The detail of "comparative process of the muscle region" will be described later.

A plurality of medical images having different imaging times will be comparatively displayed, and the operator evaluates the effect of training (step 1006). Muscle of the femoral region is formed by a several kinds of muscles such as lateral vastus muscle 35 or medial vastus muscle 37 in the anterior part of a thigh and hamstrings (biceps femoris, semitendinosus muscle or semimembranosus muscle) in the exterior part of a thigh. The kind of training and its degree of effectiveness can be evaluated with high accuracy by comparing medical images of femoral cross-sections 31 having different imaging times.

First Embodiment (3. Calculation of a Fascia and Extraction Process of a Fat Region in the Inner and Outer Fascia)

Next, the first embodiment will be described referring to FIG. 4~FIG. 11.

(3-1. Extraction of a Muscle Region)

Figure 4:
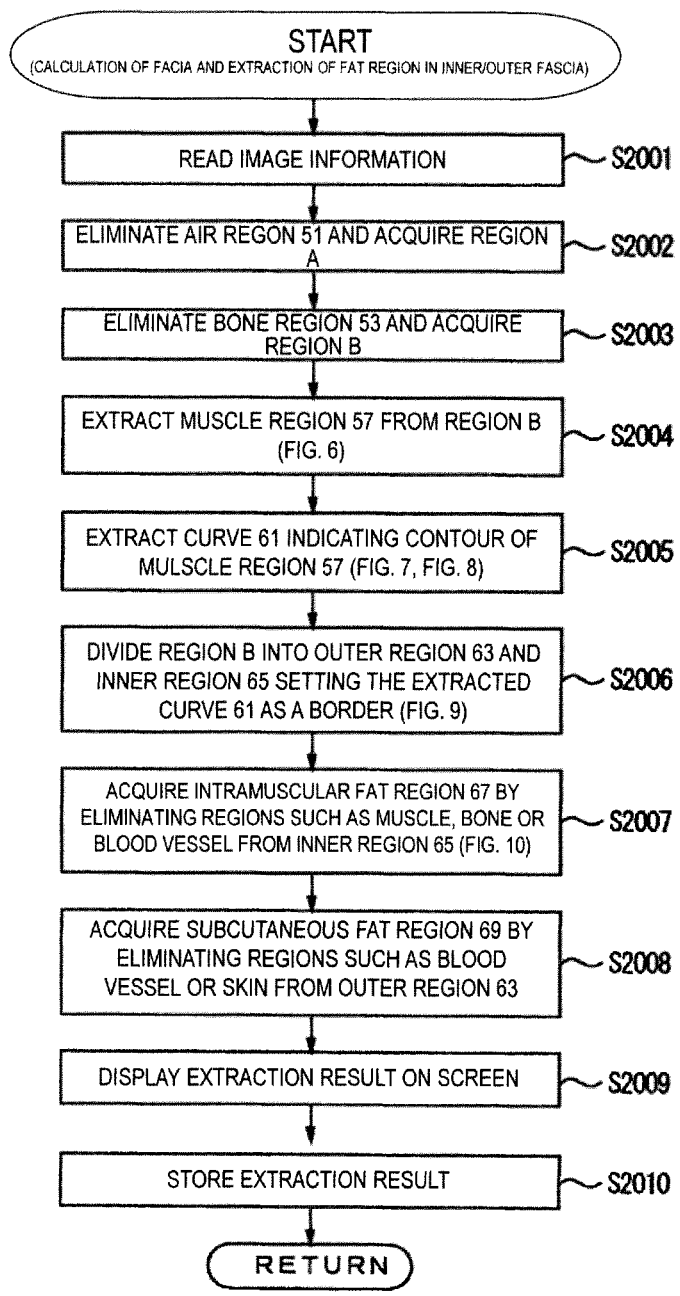
FIG. 4 is a flowchart showing calculation of a fascia and an extraction process of a fat region in the inner and the outer fascia.

FIG. 4 is a flowchart showing calculation of a fascia and extraction process of a fat region in the inner and outer fascia executed by medical image processing device 1.

CPU 9 of medical image processing device 1 acquires medical image information imaged by medical imaging apparatus 5 from storage device 13 or image database 7, and loads the acquired information to main memory 11 (step 2001).

FIG. 5 shows the acquired image information 301. Image information 301 is tomographic image information of a femoral region imaged by an X-ray CT apparatus. The outside of femoral skin 55 is air region 51. Bone region 53 is a femur.

Next, medical image processing device 1 deletes image information of air region 51 which is the region having low CT values in image information 301, and acquires region A (not shown in the diagram) (step 2002). That is, image information having a CT value (−1000 HU (Housfield Unit)) of air region 51 is deleted from image information 301. Therefore, region A is the region wherein air region 51 is eliminated from the entire image information 301.

Next, medical image processing device 1 acquires region B (not shown in the diagram) by eliminating image information having high CT values (about 1000 HU) indicating bone region 53 from region A (step 2003). Therefore, region B is a region wherein bone region 53 is eliminated from region A.

Medical image processing device 1 acquires image information 302 (FIG. 6) by extracting image information having the CT values corresponding to muscle region 57 (about 30~80 HU) from region B (step 2004). Muscle region 57 may be acquired by eliminating information of fat or skin from region B on the basis of the CT values.

Figure 6:
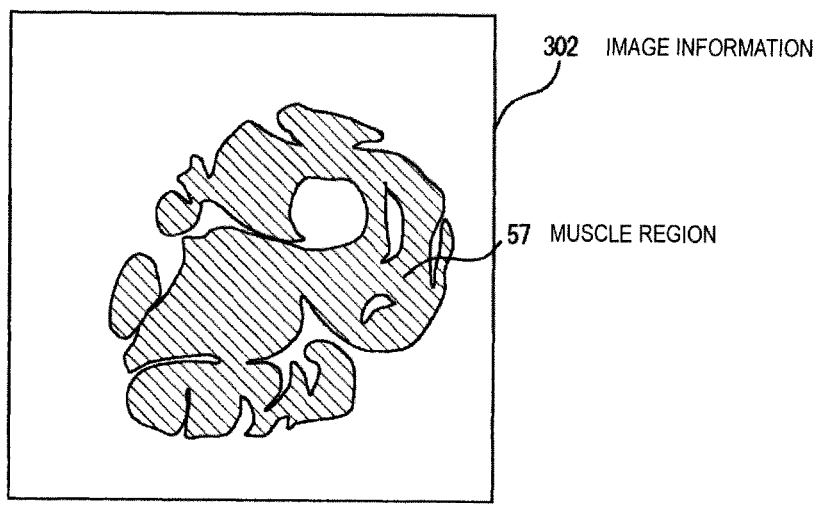
FIG. 6 shows image information 302.

FIG. 6 shows image information 302. Image information 302 shows the extracted muscle region 57.

(3-2. Extraction of a Muscle)

Next, medical image processing device 1 extracts curve 61 indicating the contour of muscle region 57 (step 2005).

Figure 7:
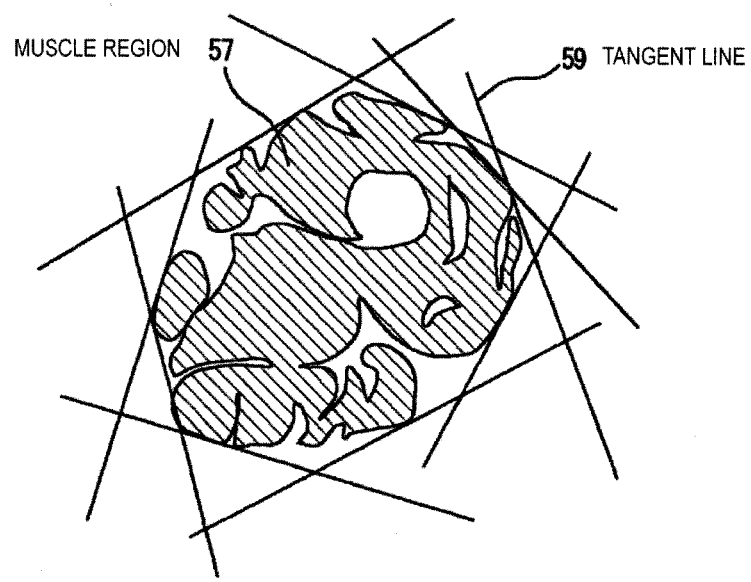
FIG. 7 is an explanatory diagram of the extraction method of curve 61.

FIG. 7 is an explanatory diagram showing an example of the method for extracting curve 61.

Medical image processing device 1 draws a plurality of arbitrary tangent lines 59 which is circumscribed to muscle region 57. Medical image processing device 1 calculates curve 61 which is inscribed to the closed region being enveloped by the plurality of tangent lines 59. The calculated curve 61 can be approximated as a fascia which is difficult to visually recognize. Higher accuracy can be gained in acquisition of curve 61 when the number of tangent lines is greater.

Next, another example of the method for extracting curve 61 will be described (not shown in the diagrams). Medical image processing device 1 sets a plurality of arbitrary apical points that are on the contour of muscle region 57. An example of the method for setting the apical points is to appoint a reference point inside of muscle region 57, and sets a plurality of points on the contour as apical points in order that the distance from the reference point to the contour of muscle region 57 is long. Medical image processing device 1 acquires curve 61 by performing spline interpolation on the set apical points. The larger the number of the set apical points is, the higher accuracy can be gained in acquisition of curve 61.

Figure 8:
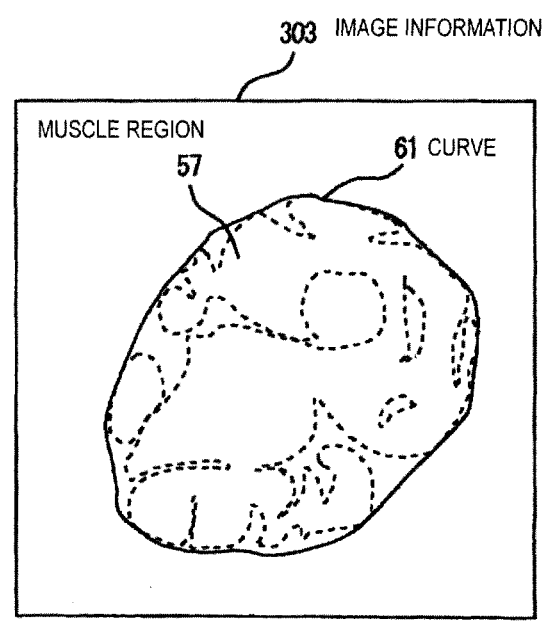
FIG. 8 shows image information 303 including curve 61 for approximating a fascia.

FIG. 8 shows image information 303 including curve 61 for approximating a fascia.

The fascia which covers muscle region 57 is extracted as curve 61 which is circumscribed to muscle region 57.

(3-3. Discrimination of a Fat Region in the Inner and Outer Fascia).

Figure 9:
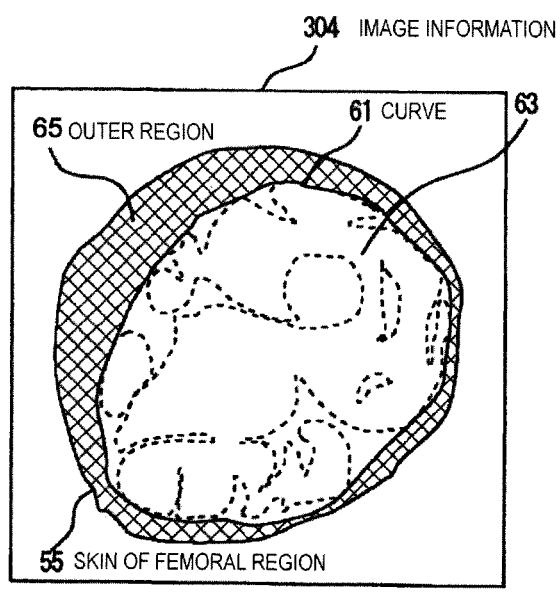
FIG. 9 shows image information 304.

Next, medical image processing device 1 divides region B (the region wherein air region 51 and bone region 53 are eliminated from image information 301) into outer region 63 and inner region 65 by setting curve 61 which indicates the extracted contour of muscle region 57 as the border, and obtains image information 304 (step 2006: FIG. 9).

FIG. 9 shows image information 304. Image information 304 indicates outer region 63 of curve 61 (between femoral skin 55 and curve 61) and inner region 65 (the closed region enveloped by curve 61).

Next, medical image processing device 1 obtains intramuscular fat region 67 by eliminating image information of the regions such as the muscle region, bone region or blood vessel region from inner region 65 using the CT values (step 2007: FIG. 10).

FIG. 10 shows image information 305. Image information 305 shows curve 61 and intramuscular fat region 67 which is inside of curve 61.

Next, medical image processing device 1 obtains subcutaneous fat region 69 by eliminating image information of the regions such as a blood vessel region or skin region from outer region 63 using the CT values (step 2008).

Figure 11:
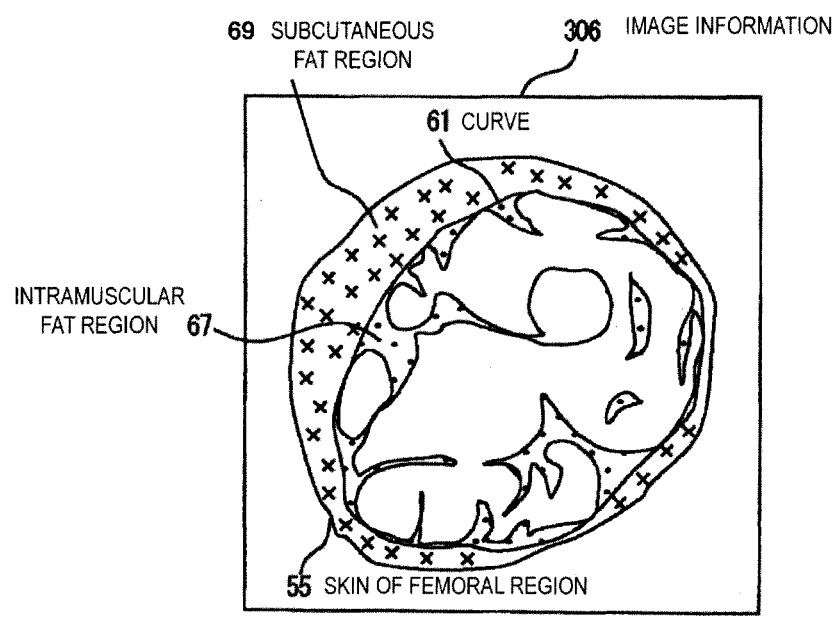
FIG. 11 shows image information 306 for distinguishing intramuscular fat region 67 and subcutaneous fat region 69.

FIG. 11 shows image information 306. Image information 306 shows intramuscular fat region 67 acquired in step 2007 and subcutaneous fat region 69 acquired in step 2008 by distinguishing them.

Medical image information device displays intramuscular fat region 67 and subcutaneous fat region 69 that are the extraction result on display device 17 by distinguishing them (step 2009). Medical image processing device 1 may calculate the area of intramuscular fat region 67 or subcutaneous fat region 69 and display them. Medical image processing device may display each of intramuscular fat region 67 or subcutaneous fat region 69 using different colors or display means (different shaded patterns, etc.).

Medical image processing device 1 stores the result of the above-described extractions in storage device 13 (step 2010).

(3-4. Effect of the First Embodiment)

As described above, in the first embodiment, medical image processing device 1 is capable of acquiring an imaginary fascia, and automatically divides the fat region into the subcutaneous fat region and the intramuscular fat region while setting the fascia as a border, which makes it possible to quantitatively obtain the amount of intramuscular fat which is the result of muscle training or treatment with high accuracy. Particularly, since the position of a fascia varies with time as a result of muscle training or treatment, the first embodiment that divides the fat region by setting the fascia as a border is effective for observing variation of the fat region with time, as is the second embodiment to be described later.

Also, since the region divided into the subcutaneous fat region and the intramuscular fat region is displayed by visually distinguished, diagnosis errors by an operator can be prevented which leads to diagnosis with high accuracy.

Second Embodiment (4. Comparative Processing of a Muscle Region)

Next, the second embodiment will be described referring to FIG. 12~FIG. 20. In the second embodiment, plural sets of medical image information having different imaging times are compared so as to make diagnosis of the effect in muscle training or treatment by comparing the variation of the muscle region.

(4-1. Extraction of the Muscle Region for Comparison)

Figure 12:
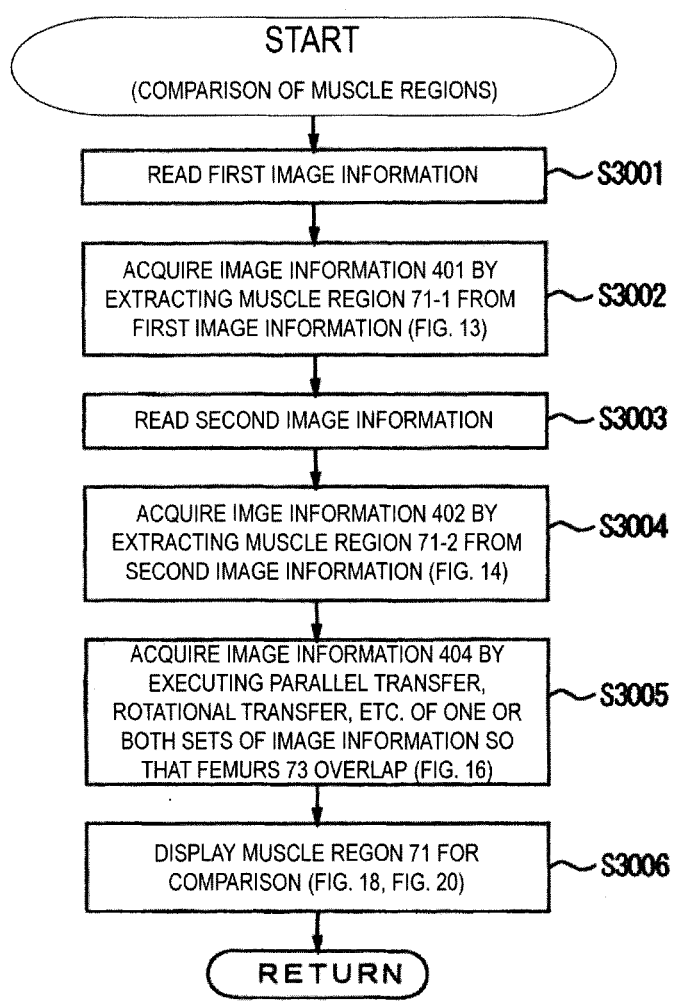
FIG. 12 shows a flowchart showing a comparative process of a muscle region.

FIG. 12 is a flowchart showing the comparative process of a muscle region to be executed by medical imaging processing device 1.

CPU 9 of medical information processing device 1 acquires a first image information imaged by medical imaging apparatus 5 from storage device 13 or image database 7, and loads the acquired information to main memory 11 (step 3001).

Figure 13:
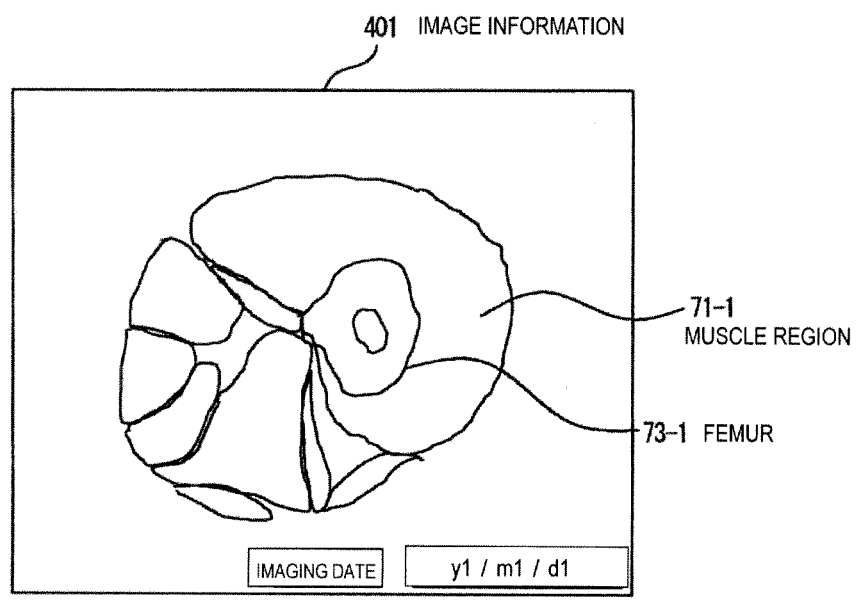
FIG. 13 shows image information 401.

Medical image processing device 1 extracts muscle region 71-1 from the first image information using the CT values, and obtains image information 401 (step 3002: FIG. 13).

FIG. 13 shows image information 401. Image information 401 is obtained by extracting the region of muscle 71-1 and femur 73-1 from the first image information imaged on the imaging date "y:1, m:1, d:1".

Next, medical image processing device 1 obtains a second image information which has the same condition and different imaging date as the first image information from storage device 13 or image database 17, and loads the obtained information in main memory 11 (step 3003).

Figure 14:
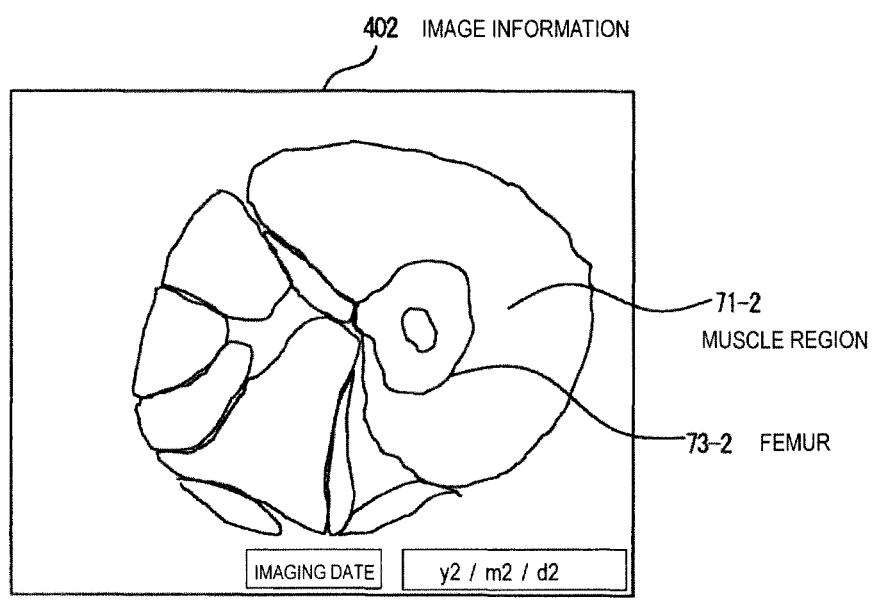
FIG. 14 shows image information 402.

Medical image processing device 1 obtains image information 402 by extracting muscle region 71-2 from the second image information using the CT values (step 3004: FIG. 14).

FIG. 14 shows image information 402. Image information 402 is obtained by extracting muscle region 71-2 and femur 73-2 from the second image information imaged on the imaging date "y:2, m:2, d:2".

(4-2. Positional Adjustment of Image Information)

Figure 15:
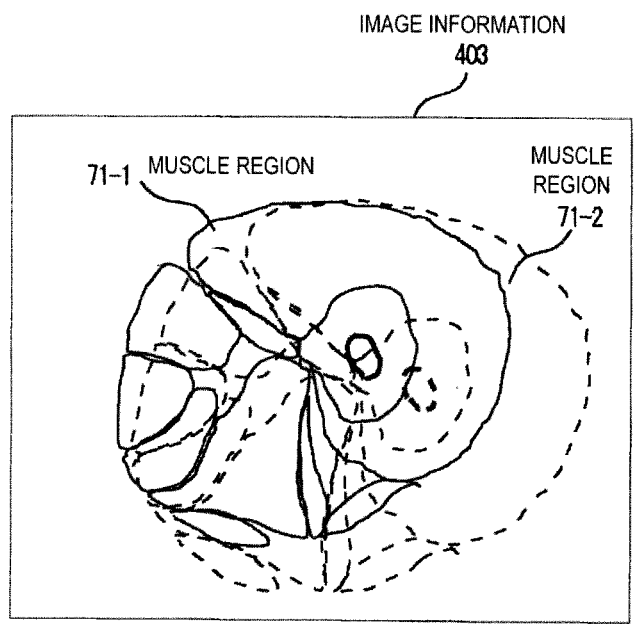
FIG. 15 shows image information 403 wherein image information 401 and image information 402 are overlapped.

Next, medical image processing device 1 superposes image information 401 (FIG. 13) and image information 402 (FIG. 14), and obtains image information 403 (FIG. 15).

FIG. 15 shows image information 403. Image information 403 is created by merely superposing image information 401 and image information 402, thus it is difficult to compare muscle region 71-1 in image information 401 and muscle region 71-2 in image information 402.

Medical image processing device 1 obtains image information 404 by executing parallel transfer or rotational transfer of one or both sets of image information, so as to superpose the region of femur 73-1 in image information 401 and the region of femur 73-2 in image information 402 (step 3005: FIG. 16). Scaling may also be performed on any image information.

FIG. 16 shows image information 404. Positioning is executed on image information 404 to match femur 73-1 in image information 401 and femur 73-2 in image information 402, and the matched femur is displayed as femur 73. Image information 404 shows the difference between muscle region 71-1 and muscle region 71-2 (difference in the areas of the regions) clearly.

(4-3. Display of Image Information)

Next, image information processing device 1 displays muscle region 71 of a plurality of images taken on the different dates based on image information 404 (FIG. 16) (step 3006).

The display method of medical images will be described below.

Figure 17:
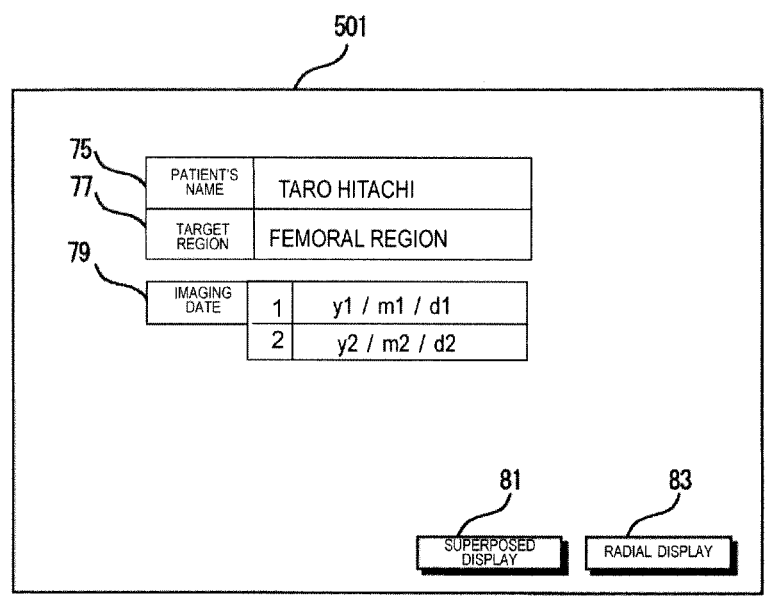
FIG. 17 shows screen 501 for selecting the display method.

FIG. 17 shows screen 501 which is selected in the display method and displayed on display device 17. On screen 501, patient's name 75, imaged region 77 and imaged date 79 of the plurality of acquired medical images are displayed. Also, "superposed display" button 81 and "radial display" button 83 are disposed on screen 501 for selecting the method for image display. The operator pushes "superposed display button 81" or "radial display" button 83 from screen 501 displayed on display device 17 to select a comparative method for displaying images.

(4-3-1. Superposed Display)

When "superposed display" button 81 is pushed down by an operator, medical image processing device 1 calculates each area of muscle region 71-1 and muscle region 71-2 and causes display device 17 to display the calculated areas based on image information 404 (FIG. 16).

FIG. 18 shows screen 502 displayed on display device 17 in the case that the "superposed display" is selected.

On screen 502, image information 404 (FIG. 16), e.g. image information created by superposing muscle region 71-1 in image information 401 (FIG. 13) and muscle region 71-2 in image information 402 (FIG. 14) to match the position of femur 73 is displayed. Also, the muscle areas of muscle region 71-1 and muscle region 71-2 are calculated, and displayed as "muscle area S1 cm2" 85-1 and "muscle area S2 cm2" 85-2 respectively. Each of muscle region 71-1 and muscle region 71-2 may be displayed by different colors or patterns.

When "end" button 87 is pushed down, display process is completed. When "return" button 89 is pushed down, screen 501 which is selected in the display method (FIG. 17) is displayed again on display device 17.

By selecting superposed display, the operator can instantly grasp the difference of areas of the muscle regions in a plurality of images visually and numerically. Therefore, the operator can diagnose the effect of training or treatment speedily and accurately by comparing areas of muscles.

(4-3-2. Radial Display)

When "radial display" button 83 is pushed down by the operator, medical image processing device 1 obtains image information 404 (FIG. 16), and displays muscle region 71-1 and muscle region 71-2 by using polar coordinates.

Figure 19:
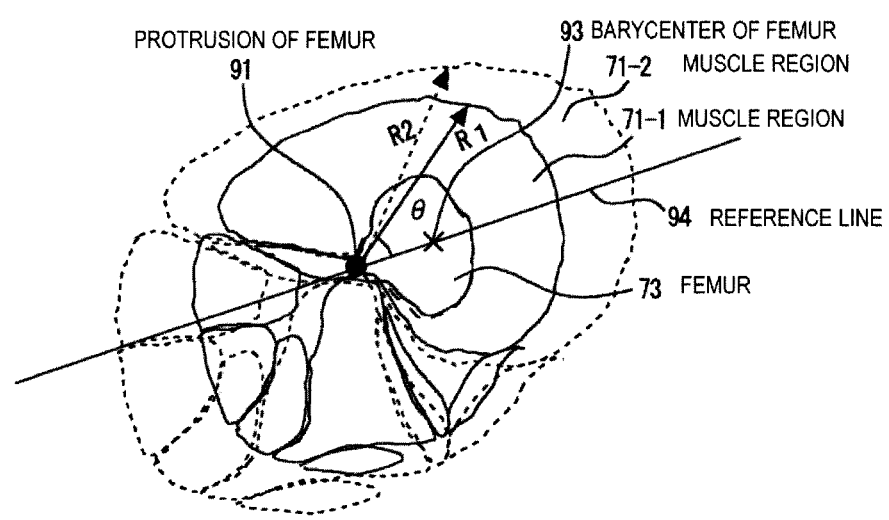
FIG. 19 is for explaining the setting of polar coordinates.

FIG. 19 shows the setting of polar coordinates.

On the basis of image information 404, femur protrusion 91 is set as the origin of the polar coordinates, the barycenter of femur 73 is extracted as femur barycenter 93, and the straight line which connects femur protrusion 91 and femur barycenter 93 is set as reference line 94. Also, the angle formed by the direction from the origin to the border of the muscle region and reference line 94 is set as "θ", the distance from the origin to the border of muscle region 71-1 is set as "R1", and the distance from the origin to the border of muscle region 71-2 is set as "R2". In other words, the direction from the origin toward femur barycenter 93 is set as angle of the polar coordinates "θ=0°".

Figure 20:
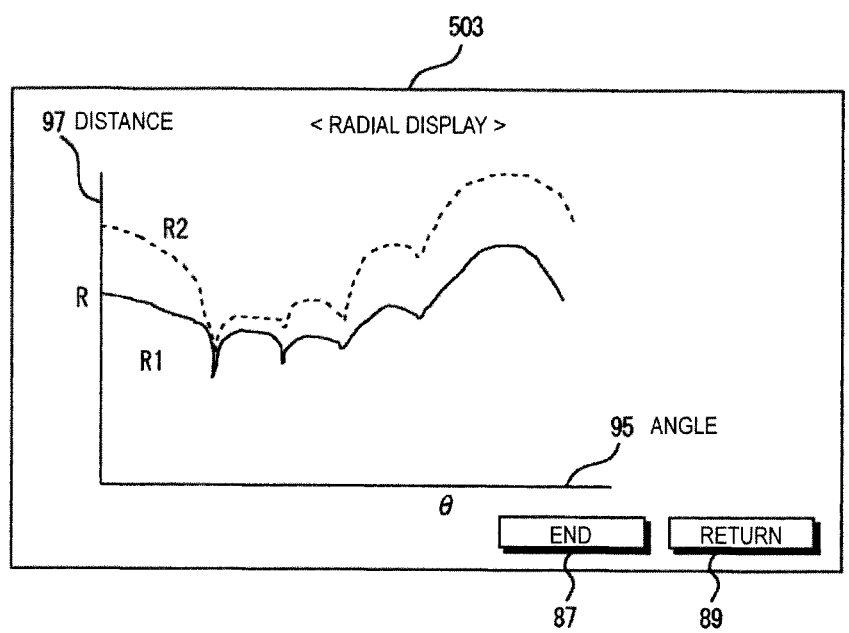
FIG. 20 shows screen 503 of the radial display.

FIG. 20 shows screen 503 which is displayed on display device 17 in the case that "radial display" is selected.

On screen 503, distance "R1" from the origin (femur protrusion 91) to the border of muscle region 71-1 and distance "R2" from the origin to the border of muscle region 71-2 are displayed based on image information 404 (FIG. 16) using the polar coordinates.

The lateral axis of the graph in screen 503 indicates angle 95 ("θ") of the polar coordinates, and the longitudinal axis indicates distance 97 ("R") from the origin to the border of the muscle region.

When "end" button 87 is pushed down, the display process is completed. When "return" button 89 is pushed down, screen 501 (FIG. 17) which is selected in the display method is displayed again on display device 17.

By choosing the radial display, the operator can quickly diagnose variation of the muscle region in a predetermined direction with respect to reference line 94. For example, it is possible to easily diagnose which direction of the muscle in the femoral region shows the effect of training or treatment as variation in the measured muscle using a graph (FIG. 20) by radial display.

(4-4. Effect of the Second Embodiment)

As described above, in the second embodiment, medical image processing device 1 is capable of obtaining plural sets of medical image information having different imaging times and diagnosing effect of muscle training or treatment speedily by comparing variations in the muscle region.

Also, as the comparative display method of variations in the muscle region, variation of the area in a muscle can be quickly diagnosed using superposed display by positioning plural sets of medical image information. Also, by quantitatively comparing the areas of a muscle, effect of training or treatment can be accurately diagnosed.

Also, by radial-displaying variations of the muscle region in plural sets of medical image information, since variations of the muscle region can be compared in the same direction of the muscle region, it is possible to rapidly diagnose on which part of the muscle the effect of training or treatment was evident.

<Determination of an Imaging Target Region>

(5. Determination of a Femoral Region and a Lower Leg Region)

Next, determination of a diagnostic region will be described referring to FIG. 21 and FIG. 22.

While a femoral region was exemplified as the imaging target region in the second embodiment, the imaging target region is not limited thereto. For example, the case that the imaging target region is a femoral region or a lower leg region will be exemplified below.

FIG. 21 is a flowchart showing the comparative process of the muscle regions of a femoral region or a lower leg region. CPU 9 of medical image processing device 1 acquires plural sets of medical image information imaged by medical imaging apparatus 5 from storage device 13 or image database 7, and loads the acquired information in main memory 11 (step 4001).

Medical image processing device 1 extracts the number of bones with respect to the medical image information based on distribution of the image information having the CT value of the bone region (step 4002).

If the number of bones is one with respect to one leg in the image of the object ("one bone in one leg" in step 4002), the imaging region of the medical image information is determined as a femoral region. Setting of polar coordinates and screen display will not be explained here, since they have been described in the second embodiment (step 4003 and step 4004).

If there are two bones in one leg of the object's image ("two bones in one leg" in step 4002), the imaging region of the medical image information is determined as a lower leg region.

The lower leg region has two bones that are a "shin bone" and a "calf bone". Medical image processing device 1 sets, in medial image information of the lower leg region, the origin and the reference line for displaying the polar coordinates.

FIG. 22 shows how to acquire the origin and the reference line in leg cross-section 98.

Leg cross-section 98 has shin bone 99 and calf bone 101, and has a muscle region mainly in the posterior part (a calf part) of the leg region.

In leg cross-section 98, barycenters of shin bone 99 and calf bone 101 are acquired as shin bone barycenter 108 and calf bone barycenter 105 respectively. The midpoint of shin-bone barycenter 107 and calf bone barycenter 105 is set as polar coordinate origin 109, and the straight line to connect shin bone barycenter 107 and calf bone barycenter 105 is set as reference line 108 (step 4005).

Medical image processing device 1 comparatively displays the muscle region of plural sets of medical image information using the polar coordinate (step 4006). Setting of polar coordinates and the method for radial display will not be explained here, since they have been described in the second embodiment.

As described above, an imaging target region of medical image information can be automatically determined by determining the number of bone regions. Accordingly, the setting method of polar coordinates or screen display method can be set automatically, whereby preventing errors by operators and improving its operability.

Determination of imaging region in a bone region is not limited to determination of a femoral region and a lower leg region. By executing determination of bone regions including a chest region or abdominal region of an object, imaging regions can be automatically determined which leads to a speedy diagnosis.

(6. Other Matters)

Medical image processing device 1 may be configured by combining the first embodiment and second embodiment as desired. Accuracy of diagnosis can be improved by determining the effect of training or treatment from different viewpoints such as variation with time in amount of an intramuscular fat and a muscle region.

Also, while diagnosis of a cross-sectional image is described by exemplifying a femoral region or a lower leg region, target regions are not limited thereto. The medical image processing device of the present invention can be applied not only to a femoral region or a lower leg region, but also to cross-sectional images of other biological tissues.

Also, while an X-ray CT apparatus is exemplified as a medical imaging apparatus for the above-described embodiments, the present invention can be applied to diagnosis of medical image information acquired by other medical imaging apparatuses such as an MRI apparatus or ultrasonic diagnostic apparatus. In such cases, at least one of the pixel value, density value and luminance value of an image is to be applied in place of the CT value. In the case of an X-ray CT apparatus, the CT value is reflected to the pixel value.

The preferable embodiments of the medical image processing device according to the present invention have been described. However, the present invention is not limited to these embodiments. It is obvious that persons skilled in the art can make various kinds of alterations or modifications within the scope of the technical idea disclosed in this application, and it is understandable that they belong to the technical scope of the present invention.

DIAGRAMS

FIG. 1
1 MEDICAL IMAGE PROCESSING DEVICE
3 NETWORK
5 MEDICAL IMAGING APPARATUS
7 IMAGE DATABASE
9 CPU

11 MAIN MEMORY
13 STORAGE DEVICE
15 DISPLAY MEMORY
17 DISPLAY DEVICE
19 CONTROLLER
21 MOUSE
23 KEYBOARD
25 NETWORK ADAPTER
27 SYSTEM BUS
FIG. 2
S1001 EVALUATE FAT REGION OF INNER/OUTER FASCIA?
S1002 CALCULATION OF FACIA AND EXTRACTION OF FAT REGION IN INNER/OUTER FASCIA
S1003 EVALUATION
S1004 COMPARE VARIANCES OF MUSCLE REGION?
S1005 COMPARISON OF MUSCLE REGIONS
S1006 EVALUATION
FIG. 3
CROSS-SECTION VIEW OF FEMORAL REGION
FEMUR
LATERAL VASTUS MUSCLE
MEDIAL VASTUS MUSCLE
GRACILIS
STORIUS
SKIN OF FEMORAL REGION
SUBCUTANEOUS FAT
FIG. 4
START (CALCULATION OF FACIA AND EXTRACTION OF FAT REGION IN INNER/OUTER FASCIA)
S2001 READ IMAGE INFORMATION
S2002 ELIMINATE AIR REGION 51 AND ACQUIRE REGION A
S2003 ELIMINATE BONE REGION 53 AND ACQUIRE REGION B
S2004 EXTRACT MUSCLE REGION 57 FROM REGION B (FIG. 6)
S2005 EXTRACT CURVE 61 INDICATING CONTOUR OF MUSCLE REGION 57 (FIG. 7, FIG. 8)
S2006 DIVIDE REGION B INTO OUTER REGION 63 AND INNER REGION 65 SETTING THE EXTRACTED CURVE 61 AS A BORDER (FIG. 9)
S2007 ACQUIRE INTRAMUSCULAR FAT REGION 67 BY ELIMINATING REGIONS SUCH AS MUSCLE, BONE OR BLOOD VESSEL FROM INNER REGION 65 (FIG. 10)
S2008 ACQUIRE SUBCUTANEOUS FAT REGION 69 BY ELIMINATING REGIONS SUCH AS BLOOD VESSEL OR SKIN FROM OUTER REGION 63
S2009 DISPLAY EXTRACTION RESULT ON SCREEN
S2010 STORE EXTRACTION RESULT
RETURN
FIG. 5
51 AIR REGION
53 BONE REGION
55 SKIN OF FEMORAL REGION
301 IMAGE INFORMATION
FIG. 6
57 MUSCLE REGION
302 IMAGE INFORMATION
FIG. 7
57 MUSCLE REGION
59 TANGENT LINE
FIG. 8
57 MUSCLE REGION
61 CURVE
303 IMAGE INFORMATION
FIG. 9
55 SKIN OF FEMORAL REGION
61 CURVE
63 OUTER REGION
65 INNER REGION
304 IMAGE INFORMATION
FIG. 10
61 CURVE
67 INTRAMUSCULAR FAT REGION
305 IMAGE INFORMATION
FIG. 11
55 SKIN OF FEMORAL REGION
61 CURVE
67 INTRAMUSCULAR FAT REGION
69 SUBCUTANEOUS FAT REGION
306 IMAGE INFORMATION
FIG. 12
START (COMPARISON OF MUSCLE REGIONS)
S3001 READ FIRST IMAGE INFORMATION
S3002 ACQUIRE IMAGE INFORMATION 401 BY EXTRACTING MUSCLE REGION 71-1 FROM FIRST IMAGE INFORMATION (FIG. 13)
S3003 READ SECOND IMAGE INFORMATION
S3004 ACQUIRE IMAGE INFORMATION 402 BY EXTRACTING MUSCLE REGION 71-2 FROM SECOND IMAGE INFORMATION (FIG. 14)
S3005 ACQUIRE IMAGE INFORMATION 404 BY EXECUTING PARALLEL TRANSFER, ROTATIONAL TRANSFER, ETC. OF ONE OR BOTH SETS OF IMAGE INFORMATION SO THAT FEMURS 73 OVERLAP (FIG. 16)
S3006 DISPLAY MUSCLE REGION 71 FOR COMPARISON (FIG. 18, FIG. 20)
RETURN
FIG. 13, FIG. 14, FIG. 15, FIG. 16
筋肉領域 MUSCLE REGION
大腿骨 FEMUR
画像情報 IMAGE INFORMATION
(他 図 １ ７ 参照)
FIG. 17
75 PATIENT'S NAME TARO HITACHI
77 TARGET REGION FEMORAL REGION
79 DATE 1 y: 1 m: JANUARY d: 1
  2 y: 2 m: FEBRUARY d: 2
81 SUPERPOSED DISPLAY
83 RADIAL DISPLAY
501 SCREEN
FIG. 18
85-1, 85-2 MUSCLE AREA
87 END
89 RETURN
(他 図 １ ３, 図 １ ７ 参照)
FIG. 19
71-1, 71-2 MUSCLE REGION
73 FEMUR
91 PROTRUSION OF FEMUR
93 BARYCENTER OF FEMUR
94 REFERENCE LINE
FIG. 20
95 ANGLE
97 DISTANCE
(他 図 １ ７, 図 １ ８ 参照)
FIG. 21
START (COMPARISON BETWEEN MUSCLE REGIONS OF FEMORAL REGION OR LOWER LEG REGION)
S4001 READ IMAGE INFORMATION TO BE COMPARED

S4002 NUMBER OF BONES?
S4003 OBTAIN POLAR COORDINATES WITH THEIR ORIGIN AT PROTRUSION OF FEMUR
S4004 EXECUTE PARALLEL OR ROTATIONAL TRANSFER ON ONE OR BOTH IMAGES SO THAT FEMURS OVERLAP
S4005 OBTAIN POLAR COORDINATES WITH THEIR POLAR COORDINATE ORIGIN 109 AT THE RESPECTIVE MIDPOINTS OF BARYCENTER OF CALF BONE 101 AND SHIN BONE 99
S4006 DISPLAY MUSCLE REGIONS FOR COMPARISON
FIG. 22
98 CROSS SECTION OF LEG REGION
99 SHIN BONE
101 CALF BONE
103 MUSCLE REGION
105 BARYCENTER OF CALF BONE
107 BARYCENTER OF SHIN BONE
108 REFERENCE LINE
109 ORIGIN OR POLAR COORDINATES

The invention claimed is:

1. A medical image processing device comprising:
medical image information acquisition means configured to acquire plural sets of medical image information indicating a tomographic image of a femoral region in an object to be examined;
evaluation region extraction means configured to extract an evaluation region from each of the plural sets of medical image information;
evaluation region display means configured to display the evaluation region on a display device; and
evaluation region comparative display means configured to specify a femur region and a muscle region from said evaluation region, execute a parallel transfer process, rotational transfer process and scaling process on at least one of the plural sets of medical image information to match the femur region, and display the medical image information that matched the femur region to compare each muscle region,
wherein the evaluation region comparative display means sets a femur protrusion as a reference point, sets a reference line including the reference point and barycenter of the femur region, generates a graph with (i) an angle between a radius and the reference line on the horizontal axis and (ii) a distance on the radius from the reference point to the border of the muscle region on the vertical axis, and displays the graph on the display device.

2. The medical image processing device according to claim 1, wherein:
the evaluation region extraction means specifies a muscle region and a fat region based on the acquired medical image information, calculates a closed contour curve indicating the contour of the muscle region, divides the fat region into an inner region and an outer region of the contour curve, and extracts the evaluation region on the inside of the contour curve as a first evaluation region and the evaluation region on the outside of the contour curve as a second evaluation region; and
the evaluation region display means displays the first evaluation region and the second evaluation region by distinguishing them.

3. The medical image processing device according to claim 2, wherein the evaluation region extraction means creates a straight line group which is tangent to the muscle region, and obtains the curve inscribing the closed region formed by the straight line group as the contour curve.

4. The medical image processing device according to claim 2, wherein the evaluation region extraction means acquires a plurality of apical points on the contour of the muscle region, calculates the curve wherein the plurality of apical points are interpolated, and obtains the calculated curve as the contour curve indicating the contour of the muscle region.

5. A medical image processing apparatus comprising a processor and one or more programs of instructions embodied in a non-transitory medium and executable by the processor to perform a method including:
a medical image information acquisition step that obtains plural sets of medical image information indicating a tomographic image of a femoral region in an object to be examined;
an evaluation region extraction step that extracts an evaluation region from each of the plural sets of medical image information;
an evaluation region display step that displays the evaluation region on a display device; and
an evaluation region comparative display step that specifies a femur region and a muscle region from said evaluation region, executes a parallel transfer process, rotational transfer process and scaling process on at least one of the plural sets of medical image information to match the femur region, and displays the medical image information that matched the femur region to compare each muscle region,
wherein the evaluation region comparative display step sets a femur protrusion as a reference point, sets a reference line including the reference point and barycenter of the femur region, generates a graph with (i) an angle between a radius and the reference line on the horizontal axis and (ii) a distance on the radius from the reference point to the border of the muscle region on the vertical axis, and displays the graph on the display device.

6. A program of executable instructions embodied in a non-transitory medium to cause a computer to function as a medical image processing device comprising:
medical image information acquisition means configured to acquire plural sets of medical image information indicating a tomographic image of a femoral region in an object to be examined;
evaluation region extraction means configured to extract an evaluation region from each of the plural sets of medical image information;
evaluation region display means configured to display the evaluation region on a display device; and
evaluation region comparative display means configured to specify a femur region and a muscle region from said evaluation region, execute a parallel transfer process, rotational transfer process and scaling process on at least one of the plural sets of medical image information to match the femur region, and display the medical image information that matched the femur region to compare each muscle region,
wherein the evaluation region comparative display means sets a femur protrusion as a reference point, sets a reference line including the reference point and barycenter of the femur region, generates a graph with (i) an angle between a radius and the reference line on the horizontal axis and (ii) a distance on the radius from the reference point to the border of the muscle region on the vertical axis, and displays the graph on the display device.

* * * * *